US012754677B2

(12) United States Patent
Lee et al.

(10) Patent No.: US 12,754,677 B2
(45) Date of Patent: Oct. 6, 2026

(54) MEMORY CONTROLLER FOR SUPPORTING PROCESSING-IN-MEMORY

(71) Applicants: SK hynix Inc., Icheon (KR); Seoul National University R&DB Foundation, Seoul (KR)

(72) Inventors: Seungyong Lee, Seoul (KR); Minseok Seo, Seoul (KR); Chunmyung Park, Seoul (KR); Hyuk-Jae Lee, Seongnam (KR); Woojae Shin, Icheon (KR)

(73) Assignees: SK hynix Inc., Incheon (KR); Seoul National University R&DB Foundation, Seoul (KR)

( * ) Notice: Subject to any disclaimer, the term of this patent is extended or adjusted under 35 U.S.C. 154(b) by 79 days.

(21) Appl. No.: 18/191,481

(22) Filed: Mar. 28, 2023

(65) Prior Publication Data

US 2024/0168647 A1 May 23, 2024

(30) Foreign Application Priority Data

Nov. 17, 2022 (KR) ........................ 10-2022-0154772

(51) Int. Cl.
*G06F 3/06* (2006.01)

(52) U.S. Cl.
CPC .......... *G06F 3/0614* (2013.01); *G06F 3/0634* (2013.01); *G06F 3/0673* (2013.01)

(58) Field of Classification Search
CPC .... G06F 3/0614; G06F 3/0634; G06F 3/0673; G06F 3/0607; G06F 3/0659; G06F 3/0664; G06F 3/0679; G06F 3/0658; G06F 3/0604; G06F 2212/1016; G06F 2212/1032
See application file for complete search history.

(56) References Cited

U.S. PATENT DOCUMENTS

| | | | | |
|---|---|---|---|---|
| 11,074,961 | B2 * | 7/2021 | Kasibhatla | G11C 11/4093 |
| 11,079,936 | B2 * | 8/2021 | Chang | G06F 3/0659 |
| 2020/0356305 | A1 * | 11/2020 | Kim | G06F 3/0659 |
| 2022/0036929 | A1 * | 2/2022 | Yu | G11C 11/409 |
| 2022/0406369 | A1 * | 12/2022 | Kwon | G11C 11/40618 |

(Continued)

OTHER PUBLICATIONS

Junwhan Ahn et al., "A scalable processing-in-memory accelerator for parallel graph processing," In Proceedings of the 42nd Annual International Symposium on Computer Architecture., 2015, pp. 105-117.

(Continued)

*Primary Examiner* — Rocio Del Mar Perez-Velez
*Assistant Examiner* — Jonah C Krieger

(57) ABSTRACT

A memory controller controls modes for processing requests for a memory device. The modes include a normal mode for processing a memory request and a processing-in-memory (PIM) mode for processing a PIM request. The memory controller includes a bank group scheduler configured to generate a memory command corresponding to a memory request; an arbiter configured to select and output the memory command; and a PIM management circuit configured to generate a PIM command corresponding to a PIM request. The PIM management circuit controls switching between the normal mode and the PIM mode according to, among other criteria, a number of PIM commands.

10 Claims, 5 Drawing Sheets

1000

(56) References Cited

U.S. PATENT DOCUMENTS

2023/0205693 A1* 6/2023 Kotra .................. G06F 12/0811 711/122
2023/0205706 A1* 6/2023 Madan ................ G06F 12/0207 711/206
2024/0004653 A1* 1/2024 Alsop ................... G06F 9/3004

OTHER PUBLICATIONS

Junwhan Ahn et al., "PIM-enabled instructions: A low-overhead, locality-aware processing-in-memory architecture," In 2015 ACM/IEEE 42nd Annual International Symposium on Computer Architecture (ISCA). IEEE, 2015, pp. 336-348.
Bahar Asgari et al., "Fafnir: Accelerating sparse gathering by using efficient near-memory intelligent reduction," In 2021 IEEE International Symposium on High-Performance Computer Architecture (HPCA). IEEE, 2021, pp. 908-920.
Benjamin Y Cho et al., "Near data acceleration with concurrent host access," In 2020 ACM/IEEE 47th Annual International Symposium on Computer Architecture (ISCA). IEEE, 2020, pp. 818-831.
Seunghwan Cho et al., "McDRAM v2: In-dynamic random access memory systolic array accelerator to address the large model problem in deep neural networks on the edge," IEEE Access 8 (2020), 2020, pp. 135223-135243.
Quan Deng et al., "DrAcc: a DRAM based accelerator for accurate cnn inference," In Proceedings of the 55th annual design automation conference, 2018, pp. 1-6.
Mingxuan He et al., "Newton: A DRAM-maker's accelerator-in-memory (AiM) architecture for machine learning," In 2020 53rd Annual IEEE/ACM International Symposium on Microarchitecture (MICRO). IEEE, 2020, pp. 372-385.
Wenqin Huangfu et al., "Nest: Dimm based Near-Data-Processing Accelerator for K-mer Counting," In 2020 IEEE/ACM International Conference on Computer Aided Design (ICCAD), 2020, pp. 1-9.
"JEDEC.2012. DDR4 SDRAM," Jedec Solid State Technology Association, Sep. 2012, https://www.jedec.org/standards-documents/docs/jesd79-4a.
Hongju Kal et al., "SPACE: locality-aware processing in heterogeneous memory for personalized recommendations," In 2021 ACM/IEEE 48th Annual International Symposium on Computer Architecture (ISCA). IEEE, 2021, pp. 679-691.
Liu Ke, et al., "Recnmp: Accelerating personalized recommendation with near-memory processing," In 2020 ACM/IEEE 47th Annual International Symposium on Computer Architecture (ISCA). IEEE, 2020, pp. 790-803.
Liu Ke, et al., "Near-Memory Processing in Action: Accelerating Personalized Recommendation With AxDIMM," IEEE Micro 42, 1 (2022), 2022, pp. 116-127, https://doi.org/10.1109/MM.2021.3097700.
Byeongho Kim et al., "Trim: Tensor reduction in memory," IEEE Computer Architecture Letters 20, 1 (2020), 2020, pp. 5-8.
Duckhwan Kim et al., "Neurocube: A programmable digital neuromorphic architecture with high-density 3D memory," ACM SIGARCH Computer Architecture News 44, 3 (2016), 2016, pp. 380-392.
Heesu Kim et al., "GradPIM: A Practical Processing-in-DRAM Architecture for Gradient Descent," In 2021 IEEE International Symposium on High-Performance Computer Architecture (HPCA). IEEE, 2021, pp. 249-262.
Yoongu Kim et al., "Atlas: A scalable and high-performance scheduling algorithm for multiple memory controllers," In HPCA-16 2010 The Sixteenth International Symposium on High Performance Computer Architecture. IEEE, 2010, pp. 1-12.
Yoongu Kim et al., "Thread cluster memory scheduling: Exploiting differences in memory access behavior," In 2010 43rd Annual IEEE/ACM International Symposium on Microarchitecture. IEEE, 2010, pp. 65-76.
Young-Cheon Kwon, et al., "A 20nm 6GB function-in-memory DRAM, based on HBM2 with a 1.2 TFLOPS programmable computing unit using bank-level parallelism, for machine learning applications," In 2021 IEEE International Solid-State Circuits Conference (ISSCC), vol. 64. IEEE, 2021, pp. 350-352.
Sukhan Lee, et al., "Hardware Architecture and Software Stack for PIM Based on Commercial DRAM Technology: Industrial Product," In 2021 ACM/IEEE 48th Annual International Symposium on Computer Architecture (ISCA). IEEE, 2021, pp. 43-56.
Seongju Lee, et al., "A 1ynm 1.25 V 8Gb, 16Gb/s/pin GDDR6-based Accelerator-in-Memory supporting 1TFLOPS MAC Operation and Various Activation Functions for Deep Learning Applications," In 2022 IEEE International Solid-State Circuits Conference (ISSCC), vol. 65. IEEE, 2022, pp. 1-3.
Shuangchen Li et al., "Scope: A stochastic computing engine for dram-based in-situ accelerator," In 2018 51st Annual IEEE/ACM International Symposium on Microarchitecture (MICRO). IEEE, 2018, pp. 696-709.
Shuangchen Li et al., "DRISA: A DRAM reconfigurable in-situ accelerator," In 2017 50th Annual IEEE/ACM International Symposium on Microarchitecture (MICRO). IEEE, 2017, pp. 288-301.
Jiawen Liu, et al., "Processing-in-memory for energy-efficient neural network training: A heterogeneous approach," In 2018 51st Annual IEEE/ACM International Symposium on Microarchitecture (MICRO). IEEE, 2018, pp. 655-668.
Lifeng Nai et al., "GraphPIM: Enabling instruction-level pim offloading in graph computing frameworks," In 2017 IEEE International symposium on high performance computer architecture (HPCA). IEEE, 2017, pp. 457-468.
Vivek Seshadri et al, "Ambit: In-memory accelerator for bulk bitwise operations using commodity DRAM technology," In 2017 50th Annual IEEE/ACM International Symposium on Microarchitecture (MICRO). IEEE, 2017, pp. 273-287.
Hyunsung Shin et al., "McDRAM: Low latency and energy-efficient matrix computations in Dram," IEEE Transactions on Computer-Aided Design of Integrated Circuits and Systems 37, 11 (2018), 2018, pp. 2613-2622.
Larry Wall et al., "500.perlbench_r Spec CPU2017 Benchmark Description," 2017, https://www.spec.org/cpu2017/.
Lavanya Subramanian et al., "BLISS: Balancing performance, fairness and complexity in memory access scheduling," IEEE Transactions on Parallel and Distributed Systems 27, 10 (2016), 2016, pp. 3071-3087.
Mingxing Zhang et al., "GraphP: Reducing communication for PIM-based graph processing with efficient data partition," In 2018 IEEE International Symposium on High Performance Computer Architecture (HPCA). IEEE, 2018, pp. 544-557.

* cited by examiner

MEMORY CONTROLLER FOR SUPPORTING PROCESSING-IN-MEMORY

CROSS-REFERENCE TO RELATED APPLICATION

The present application claims priority under 35 U.S.C. § 119(a) to Korean Patent Application No. 10-2022-0154772, filed on Nov. 17, 2022, which is incorporated herein by reference in its entirety.

BACKGROUND

1. Technical Field

Embodiments generally relate to a memory controller for supporting processing-in-memory (PIM).

2. Related Art

A PIM memory device that performs processing operations therein has been widely studied.

To control such a PIM memory device, a mode switching technique has been proposed in which operation modes of the memory device include a normal memory operation mode and a PIM operation mode.

By using the mode switching technique, various PIM commands may be implemented using existing memory device interface technology by changing the operation mode.

In order to perform the mode switching using only software, software codes for initiating mode switching operation must be added and the software codes should be supported by an operating system.

Moreover, a processor hosting the operating system must also support additional operations of the operating system.

Accordingly, it is technically and economically infeasible to implement the mode switching technique using only software.

Accordingly, there is a demand for a memory controller supporting mode switching without special intervention of the operating system.

SUMMARY

In accordance with an embodiment of the present disclosure, a memory controller controlling modes for processing requests for a memory device, the memory controller may include a bank group scheduler configured to generate a memory command corresponding to a memory request; an arbiter configured to select and output the memory command; and a PIM management circuit configured to generate a PIM command corresponding to a PIM request, wherein the modes include a normal mode for processing the memory request and a PIM mode for processing the PIM request, and wherein the PIM management circuit controls, according to a number of PIM commands, switching between the normal mode and the PIM mode.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
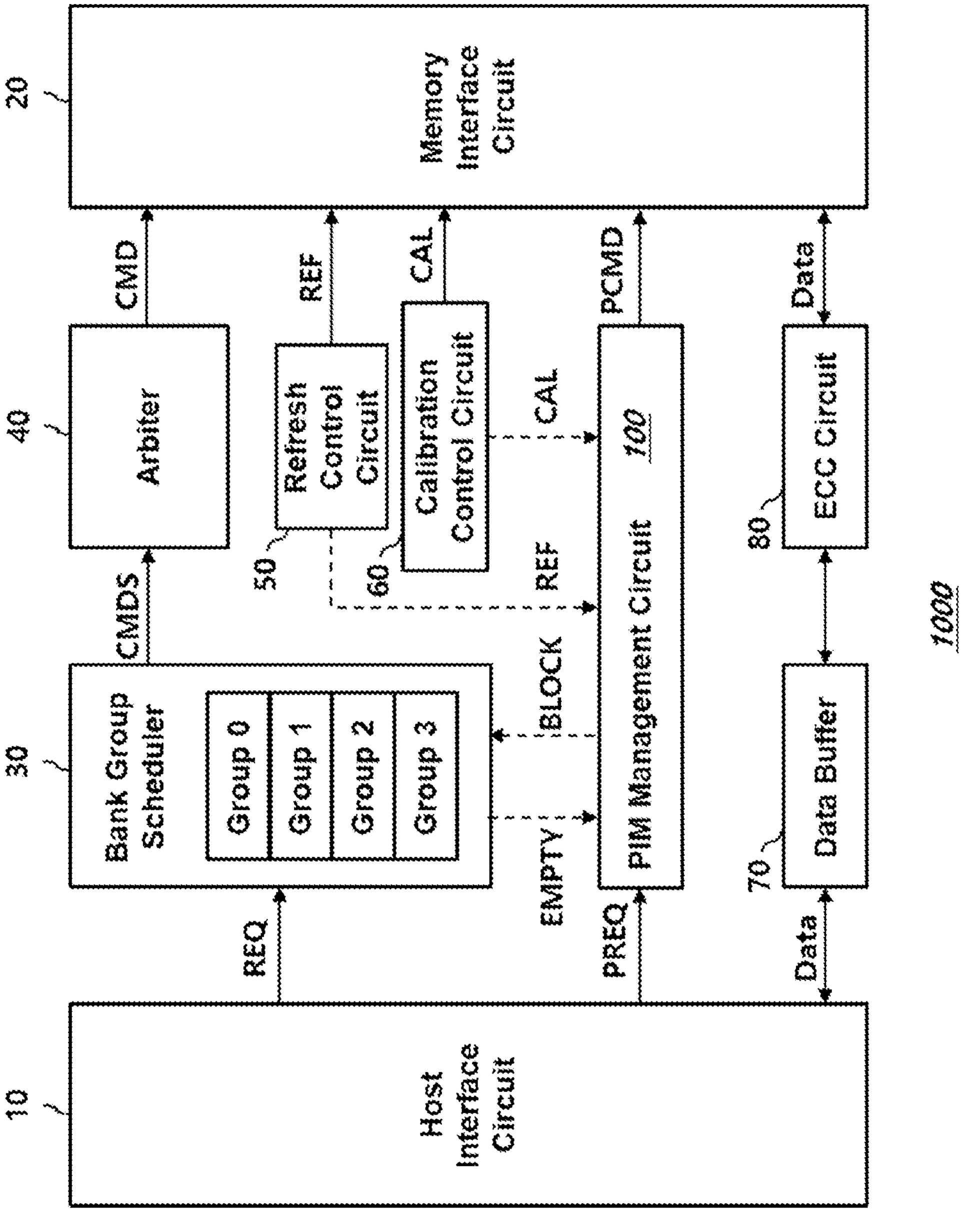
FIG. 1 illustrates a memory controller according to an embodiment of the present disclosure.

FIG. 1 is a block diagram of a memory controller 1000 according to an embodiment of the present disclosure.

The memory controller 1000 controls a PIM memory device that performs a memory operation and a PIM operation according to a mode switching technique.

A mode for performing a memory operation is referred to as a normal mode, and a mode for performing a PIM operation is referred to as a PIM mode.

Because a PIM memory device is well known through articles such as ⌈ Mingxuan He, Choungki Song, Ilkon Kim, Chunseok Jeong, Seho Kim, Il Park, Mithuna Thottethodi, and TN Vijaykumar. 2020. Newton: A DRAM-maker's accelerator-in-memory (AiM) architecture for machine learning. In 2020 53rd Annual IEEE/ACM International Symposium on Microarchitecture (MICRO). IEEE, 372385. ⌋, a detailed description thereof will be omitted.

The normal mode and the PIM mode can be specified by setting a mode register included in the PIM memory device.

Switching the operation mode of the PIM memory device by setting the mode register may be performed by a Mode Register Set (MRS) command, as will be described in detail below.

Hereinafter, the PIM memory device may be simply referred to as a memory device.

The memory controller 1000 includes a host interface circuit 10 for communicating with a host (not shown), a memory interface circuit 20 for communicating with the memory device (not shown), a bank group scheduler 30, an arbitrator 40, a refresh control circuit 50, a calibration control circuit 60, a data buffer 70, an ECC circuit 80, and a PIM management circuit 100.

In FIG. 1, the elements other than the PIM management circuit 100 are also used in a conventional memory controller and operate substantially the same as those in the conventional memory controller in the normal mode, except as may be detailed below.

Read and write requests received from the host through the host interface circuit 10 are converted into commands such as precharge (PRE), active (ACT), and column address strobe (CAS) in the bank group scheduler 30.

Hereinafter, read and write requests may be referred to as normal requests, and commands generated in response thereto may be referred to as normal commands.

A bank group corresponds to a unit including one or more banks in the memory device. In FIG. 1, it is assumed that there are four bank groups in the memory device, and the bank group scheduler 30 includes four sub-schedulers corresponding thereto, but embodiments are not limited thereto.

Commands CMDS generated by the bank group scheduler 30 are sent to the arbiter 40. The arbiter 40 selects one of the commands CMDS and provides a selected command CMD to the memory interface circuit 20, and the memory interface circuit 20 sends a command/address (C/A) signal corresponding to the command CMD to the memory device.

The refresh control circuit 50 generates a refresh signal REF at regular intervals and transmits the refresh signal REF to the memory device through the memory interface circuit 20 to control a refresh operation of the memory device.

The calibration control circuit 60 may control a calibration operation performed at regular intervals in order to maintain the quality of signals exchanged between the memory controller 1000 and the memory device.

The data buffer 70 temporarily stores data received through the host interface circuit 10. The data buffer 70 may also temporarily store data received through the memory interface circuit 20.

The data buffer 70 includes a number of storage spaces corresponding to requests. The memory controller 1000 manages data corresponding to a request by using a buffer ID BUFID identifying a storage space in the data buffer 70.

The ECC circuit 70 may control error detection and recovery operations for data stored in the data buffer 70.

The above operations are also performed in the conventional memory controller, and the memory controller 1000 can basically perform such operations performed in the conventional memory controller to control normal operations of a PIM memory device.

Accordingly, descriptions of the conventional operations performed by the memory controller 1000 will be omitted.

The memory controller 1000 according to the present embodiment may additionally control PIM operations of the memory device through the PIM management circuit 100.

A PIM request PREQ received through the host interface circuit 10 is provided to the PIM management circuit 100, and the PIM management circuit 100 generates a PIM command PCMD corresponding to the PIM request PREQ and provides the PIM command PCMD to the memory interface circuit 20.

PIM commands used in this embodiment include a PIM write command, a PIM read command, a PIM operation command, and a preparation command.

The PIM write command is a command for writing data to be used for a PIM operation into a memory device, and the PIM read command is a command for reading data generated as a result of a PIM operation from the memory device.

The PIM operation command is a command instructing a PIM operation on data written by the PIM write command. The PIM operation command can specify a type of a PIM operation. The type of a PIM operation depends on PIM operations supported by the PIM memory device.

The preparation command includes one or more of a mode change command, an all-bank precharge command, and an all-bank active command.

The operation mode of the PIM memory device may be changed from the normal mode to the PIM mode or from the PIM mode to the normal mode by the mode change command.

The all-bank active command is a command for instructing an active operation for all banks used when performing a PIM operation, and the all-bank precharge command is a command for instructing a precharge operation for all banks used when performing a PIM operation.

The PIM management circuit 100 may interact with other elements described above in the process of receiving the PIM request PREQ, generating the PIM command PCMD, and providing the PIM command PCMD to the memory interface circuit 20, as will be disclosed in detail below.

Figure 2:
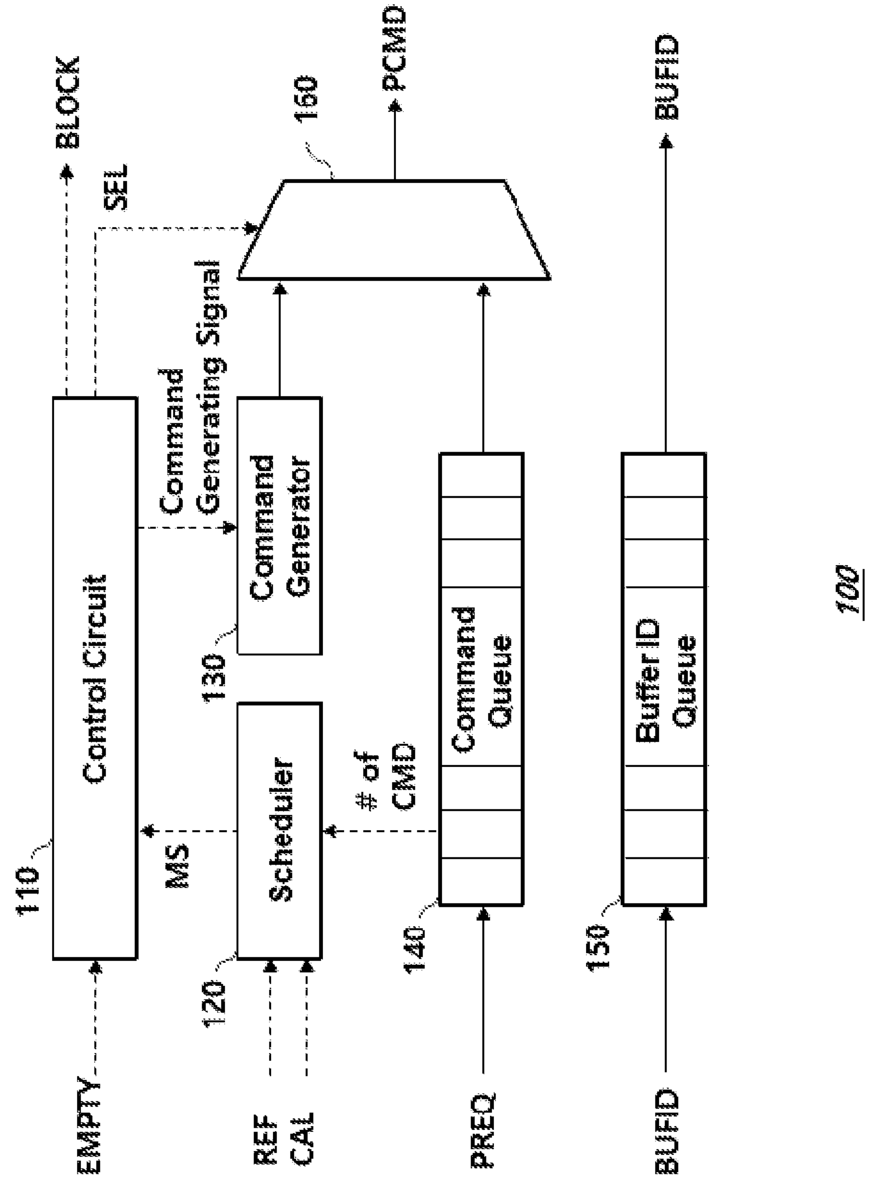
FIG. 2 illustrates a PIM management circuit according to an embodiment of the present disclosure.

FIG. 2 is a block diagram showing the PIM management circuit 100 according to an embodiment of the present disclosure.

The PIM management circuit 100 includes a control circuit 110, a scheduler 120, a command generator 130, a command queue 140, a buffer ID queue 150, and a command selection circuit 160.

The control circuit 110 controls the overall operation of the PIM management circuit 100. The control operations of the control circuit 110 will be described with reference to a state diagram of FIG. 3.

The control circuit 110 changes the operation mode according to the mode switching signal MS provided from the scheduler 120. In addition, the state of the bank group scheduler 30 may be referred to.

The scheduler 120 may determine whether to switch an operation mode by referring to the number of PIM commands stored in the PIM command queue 140. At this time, the refresh signal REF and the calibration signal CAL may be referred to.

The command generator 130 generates a corresponding PIM command when receiving a command generating signal from the control circuit 110.

Commands generated by the command generator 130 include, for example, the MRS command, the all-bank precharge command, and the all-bank active command as described above as preparation commands.

The command queue 140 stores commands corresponding to PIM requests. For example, when a PIM write request is received, a corresponding PIM write command is stored, when a PIM read request is received, a corresponding PIM read command is stored, and when a PIM operation request is received, a corresponding PIM operation command is stored.

In this embodiment, it is assumed that a PIM request and a PIM command have substantially the same data structure and, therefore, do not require a separate decoding operation.

When the respective formats of the PIM request and the PIM command are different, a decoder for converting between the formats may be further included, and the PIM command produced using the decoder may be stored in the command queue 140.

The buffer ID queue 150 has a plurality of storage spaces corresponding to the command queue 140, and in which may be stored an ID identifying a storage space of the data buffer 70 in which data corresponding to a PIM command is stored.

The command selection circuit 160 selects and outputs a PIM command generated from the command generator 130 or a PIM command stored in the command queue 140 according to a selection signal SEL provided from the control circuit 110.

The memory controller 1000 has to process both a PIM request PREQ and a memory request REQ. For this, overhead for switching between the normal mode and the PIM mode is unavoidable.

The PIM management circuit 100 efficiently performs scheduling between memory requests and PIM requests to reduce overhead, thereby preventing performance degradation.

The scheduler 120 may consider priority between memory commands and PIM commands, a number of memory commands stored in the bank group scheduler 30, a number of PIM commands stored in the command queue 140, a refresh command, a calibration command, and the like, or combinations thereof, to determine whether to perform mode switching.

Figure 3:
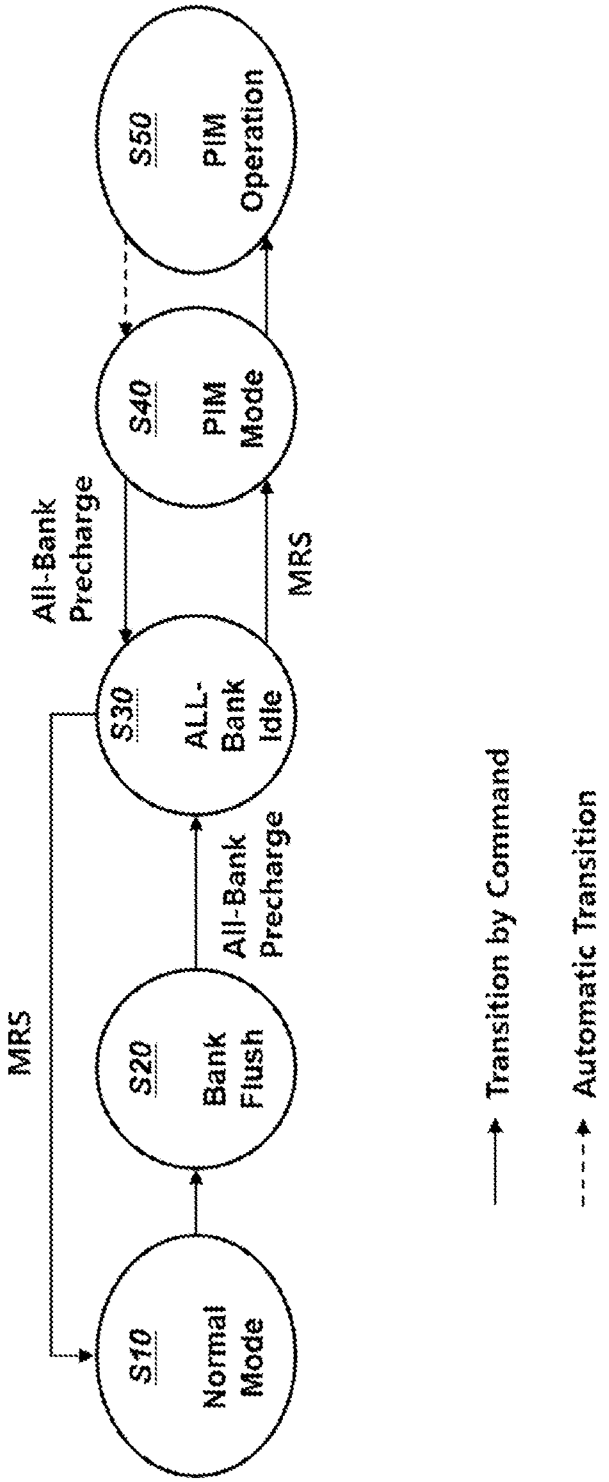
FIG. 3 is a state diagram of an operation of a controller according to an embodiment of the present disclosure.

Hereinafter, a scheduling method in the scheduler 120 according to the present embodiment will be described with reference to FIG. 3.

First, it is assumed that the current state of the PIM management circuit 100 is a normal mode state S10, and a condition for switching to a PIM mode state S40 when in this state may be similar to the following.

In this embodiment, in the normal mode state S10, the scheduler 120 monitors the number of PIM commands existing in the command queue 140 and switches to the PIM mode if the number exceeds a threshold. The threshold may be variously changed according to embodiments in consideration of the size of the command queue 140.

When the scheduler 120 sets the mode switching signal MS to switch to the PIM mode, the control circuit 110 performs a pre-operation by transitioning the current state to a bank flush state S20 before switching to the PIM mode.

In the bank flush state S20, all memory commands remaining in the bank group scheduler 30 are processed.

To this end, the control circuit 110 determines whether a memory command remains by referring to a status signal EMPTY provided from the bank group scheduler 30, and provides a control signal BLOCK to the bank group scheduler 30 so that a new memory request REQ is not received at the bank group scheduler 30. In an embodiment, the control signal BLOCK may prevent the bank group scheduler 30 from receiving new commands when the current state is the bank flush state S20 and when current state is the all-bank idle state S30. In another embodiment, the control signal BLOCK may also prevent the bank group scheduler 30 from receiving new commands when the current state is the PIM Mode state S40 and when the current state is the PIM operation state S50.

To this end, when the bank group scheduler 30 is prevented from receiving new commands, the memory controller 1000 may provide a status signal to the host so that the host does not send a memory request.

When all commands remaining in the bank group scheduler 30 are processed, the current state will transition from the bank flush state S20 to an all-bank idle state S30.

To this end, the control circuit 110 provides a command generating signal to the command generator 130 to generate the all-bank precharge command, and set the selection signal SEL so that the output of the command generator 130 is selected by the command selection circuit 160.

Accordingly, an all-bank precharge command is generated and provided to the memory device through the memory interface circuit 20, and the current state transitions from the bank flush state S20 to the all-bank idle state S30.

When transitioning to the all-bank idle state S30, the control circuit 110 provides a command generation signal to the command generator 130 so that an MRS command for mode switching to the PIM mode is generated, and sets the selection signal SEL so that the command selection circuit 160 selects the output of the command generator 130.

Accordingly, an MRS command is generated and provided to the memory device through the memory interface circuit 20, the operation mode of the memory device is set to the PIM mode, and the current state transitions from the all-bank idle state S30 to the PIM mode state S40.

At this time, the control circuit 110 sets the selection signal SEL so that a PIM command output from the command queue 140 is selected. The PIM commands stored in the command queue 140 include a PIM write command, a PIM read command, and a PIM operation command.

When a PIM command is issued, the current state transitions from the PIM mode state S40 to a PIM operation state S50. The current state transitions from the PIM operation state S50 back to the PIM mode state S40 automatically after the PIM command is processed.

Next, when the current state is the PIM mode state S40, switching conditions to the normal mode are as follows.

In this embodiment, the control circuit 110 switches to the normal mode when all PIM commands stored in the command queue 140 have been processed.

Also, in this embodiment, the control circuit 110 switches to the normal mode when the refresh signal REF is activated, when the calibration signal CAL is activated, or both, even when one or more unprocessed PIM commands remain in the command queue 140.

In such a case, the current state transitions from the PIM mode state S40 to the all-bank idle state S30.

To this end, the control circuit 110 provides a command generating signal to the command generator 130 to generate an all-bank precharge command, and sets the selection signal SEL to select the output of the command generator 130 in the command selection circuit 160.

Accordingly, the all-bank precharge command is generated and provided to the memory device through the memory interface circuit 20, and the current state transitions from the PIM mode state S40 to the all-bank idle state S30.

When transitioning the current state from the PIM mode state S40 to the all-bank idle state S30, the control circuit 110 provides a command generation signal to the command generator 130 so that an MRS command for mode switching to the normal mode is generated, and sets the selection signal SEL so that the command selection circuit 160 selects the output of the command generator 130.

Accordingly, an MRS command is generated and provided to the memory device through the memory interface circuit 20 to set the operation mode of the memory device to the normal mode, and the current state transitions from the all-bank idle state S30 to the normal mode state S10.

Figure 4:
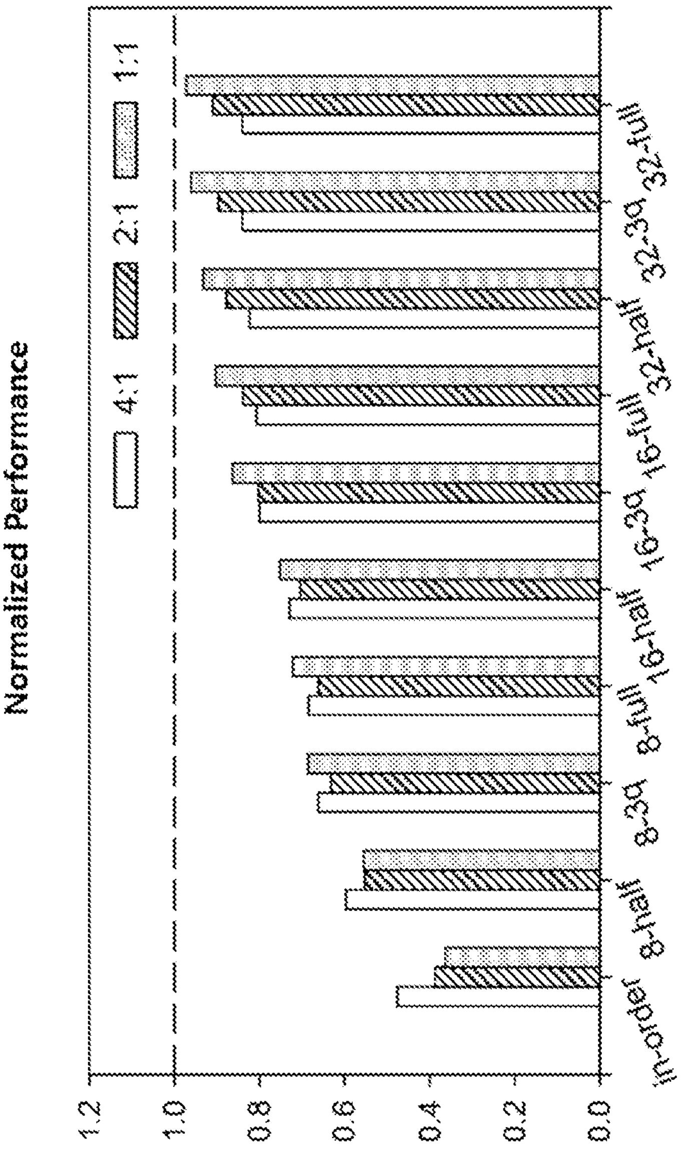
FIGS. 4 and 5 are graphs showing effects of an embodiment.

FIG. 4 is a graph showing the effect of the present embodiment.

In the graph of FIG. 4, 4:1, 2:1, and 1:1 represent the characteristics of the data set used in the test.

For example, 4:1 indicates that the ratio between PIM requests and memory requests is 4:1.

"In-order" on the X-axis of the graph represents a method of switching modes according to an order in which requests are received as a conventional technique.

On the remainder of the X-axis of the graph, the labels represents a size of the command queue 140 and a value of the threshold as a fraction of the size of the command queue 140.

For example, 8-half indicates the case where the size of the command queue 140 is 8 and the value of the threshold is half of the size (4), 8-3q indicates the case where the size of the command queue 140 is 8 and the value of the threshold is three-quarters of the size (6), and 8-full represents a case where the size of the command queue 140 is 8 and the value of the threshold is equal to the size (8).

As shown in the graph, it can be seen that performance is improved in this embodiment compared to the prior art.

The size of the command queue and the value of the threshold can be variously changed by a person skilled in the art through experiments as shown in FIG. 4.

In the above-described embodiment, switching from the PIM mode to the normal mode is performed as soon as the refresh signal REF is activated.

The refresh signal REF is activated every refresh time tREFI, but data may not immediately disappear even if the refresh operation is omitted according to the characteristics of the memory device.

Accordingly, in order to suppress frequent mode switching, mode switching may be delayed for a predetermined time after the refresh signal REF is activated instead of instantly switching the operation mode whenever the refresh signal REF is activated. This technique may be referred to as a refresh delay switching.

Figure 5:
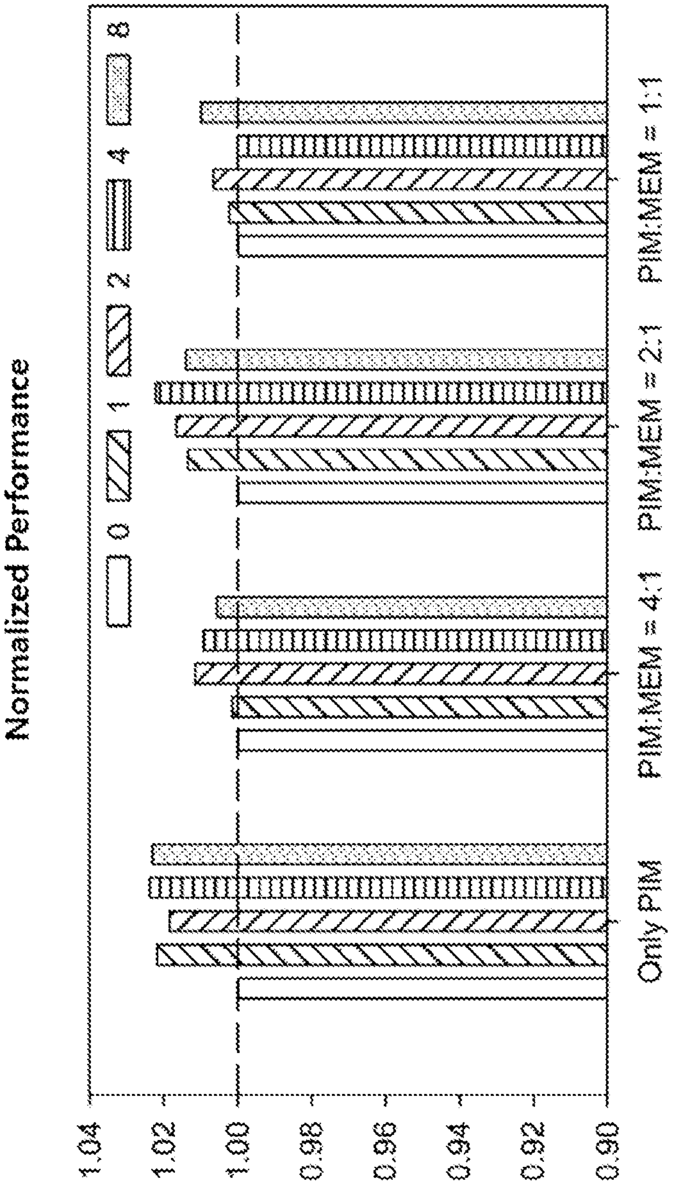

FIG. 5 is a graph showing the effect of an embodiment performing mode switching using refresh delay switching.

In the graph, 0 indicates a case in which mode switching is performed immediately after the refresh signal REF is activated, and 1, 2, 4, and 8 indicate cases in which mode switching is performed after 1, 2, 4, and 8 tREFI has passed after the refresh signal REF is activated, respectively.

In the graph, the horizontal axis represents the ratio of PIM requests and memory requests included in the data set.

As shown in the graph, the performance improvement is seen in the case of refresh delay switching regardless of the ratio of memory requests. However, the degree of performance improvement varies according to the ratio of memory requests.

A delay in switching may be applied to the calibration signal CAL in the same manner as described for the refresh signal REF, so that a calibration delay switching technique may be applied. Because the calibration delay switching is similar to the refresh delay switching, a detailed description thereof will be omitted.

Although various embodiments have been illustrated and described, various changes and modifications may be made to the described embodiments without departing from the spirit and scope of the invention as defined by the following claims.

What is claimed is:

1. A memory controller controlling modes for processing requests for a memory device, the memory controller comprising:

a bank group scheduler configured to generate a memory command corresponding to a memory request;

an arbiter configured to select and output the memory command; and a Processing In Memory (PIM) management circuit configured to generate a PIM command corresponding to a PIM request, wherein the modes include a normal mode for processing the memory request and a PIM mode for processing the PIM request, wherein the PIM management circuit includes a scheduler configured to control, according to a number of PIM commands, switching between the normal mode and the PIM mode, and wherein the scheduler performs, by outputting a mode switching signal, a first switching corresponding to a switching from the PIM mode to the normal mode in response to the activation of a refresh signal.

2. The memory controller of claim 1, wherein the PIM management circuit further includes:

a command queue configured to store the PIM command;

a command generator configured to generate a preparation command during a switching step to the normal mode or to the PIM mode;

a command selection circuit configured to select an output of the command queue or an output of the command generator; and a control circuit configured to control the command generator and the command selection circuit according to control of the scheduler.

3. The memory controller of claim 2, wherein the scheduler determines to perform a second switching corresponding to switching from the normal mode to the PIM mode when a number of PIM commands stored in the command queue exceeds a threshold.

4. The memory controller of claim 3, wherein when the scheduler determines to perform the second switching, the control circuit controls the bank group scheduler so that a new memory request is not input to the bank group scheduler and so that a bank flush operation is performed to process all memory commands stored in the bank group scheduler.

5. The memory controller of claim 4, wherein when the bank flush operation has processed all the memory commands stored in the bank group scheduler, the controller controls the command generator and the command selection circuit so that an all-bank precharge command and a Mode Register Set (MRS) command for a mode switching are provided to the memory device.

6. The memory controller of claim 5, wherein when the MRS command is provided to the memory device, the controller controls the command selection circuit so that an output of the command queue is selected.

7. The memory controller of claim 2, wherein the scheduler further determines to perform the first switching when all PIM commands stored in the command queue are processed or a calibration signal is activated.

8. The memory controller of claim 7, wherein when the scheduler determines to perform the first switching, the control circuit controls the command generator and the command selection circuit so that an all-bank precharge command and a Mode Register Set (MRS) command for a mode switching are provided to the memory device.

9. The memory controller of claim 1, wherein when the refresh signal is activated, the scheduler determines to perform the first switching after delaying a predetermined time after the refresh signal is activated.

10. The memory controller of claim 1, further comprising a host interface circuit configured to receive the memory request and the PIM request from a host and a memory interface circuit configured to provide the memory command and the PIM command to the memory device.

* * * * *